(12) United States Patent
Krause

(10) Patent No.: US 10,203,456 B1
(45) Date of Patent: Feb. 12, 2019

(54) FIBER OPTIC CABLE TO EMITTER/DETECTOR ALIGNMENT APPARATUS AND METHOD

(71) Applicant: Northrop Grumman Systems Corporation, Falls Church, VA (US)

(72) Inventor: Joseph P. Krause, Downers Grove, IL (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 0 days.

(21) Appl. No.: 16/033,250

(22) Filed: Jul. 12, 2018

(51) Int. Cl.
*G02B 6/42* (2006.01)
*G02B 6/38* (2006.01)
*G02B 7/00* (2006.01)

(52) U.S. Cl.
CPC ......... *G02B 6/3874* (2013.01); *G02B 6/3869* (2013.01); *G02B 6/4226* (2013.01); *G02B 7/003* (2013.01)

(58) Field of Classification Search
CPC .................................................. G02B 6/4226
See application file for complete search history.

(56) References Cited

U.S. PATENT DOCUMENTS

| | | | |
|---|---|---|---|
| 5,029,791 A | 7/1991 | Ceccon et al. | |
| 5,208,888 A * | 5/1993 | Steinblatt | G02B 6/4226 385/90 |
| 5,282,393 A | 2/1994 | Arnone et al. | |
| 5,638,472 A * | 6/1997 | Van Delden | G02B 6/32 385/25 |
| 5,836,080 A * | 11/1998 | Inagaki | B23Q 1/623 33/1 M |
| 6,276,843 B1 | 8/2001 | Alcock | |
| 6,498,892 B1 | 12/2002 | Harman | |
| 6,572,273 B1 | 6/2003 | Nguyen | |
| 6,940,890 B2 * | 9/2005 | Huang | H01S 3/025 372/107 |
| 7,070,339 B2 | 7/2006 | Nagasaka et al. | |
| 7,286,735 B1 * | 10/2007 | Burn, III | G02B 6/4226 385/52 |
| 7,600,926 B2 | 10/2009 | Fehrer et al. | |
| 7,764,856 B2 * | 7/2010 | Bornmann | G02B 7/004 385/134 |
| 9,572,629 B1 * | 2/2017 | Papac | A61B 90/30 |
| 2004/0165836 A1 | 8/2004 | Monson et al. | |
| 2005/0036754 A1 | 2/2005 | Monson et al. | |
| 2010/0322585 A1 | 12/2010 | Rozitis | |
| 2015/0160420 A1 * | 6/2015 | Miller | G02B 6/4226 385/90 |

* cited by examiner

*Primary Examiner* — Jerry Rahll
(74) *Attorney, Agent, or Firm* — Edell, Shapiro & Finnan, LLC

(57) ABSTRACT

An apparatus for aligning a fiber optic connector with a detector or an emitter in a housing includes a stationary base mountable on the housing, a mobile stage movable relative to the stationary base, and spring-loaded adjustment screws on the stationary base oriented orthogonally relative to one another to adjust a position of the mobile stage in x and y directions. The stationary base and mobile stage include central openings that allow the adjustment mechanism to be positioned around the fiber optic connector. The stationary base and mobile stage also include lateral slots extending inwardly from their respective peripheral edges to their respective central openings to allow passage of a fiber optic cable when positioning or removing the apparatus.

20 Claims, 3 Drawing Sheets

US 10,203,456 B1

FIBER OPTIC CABLE TO EMITTER/DETECTOR ALIGNMENT APPARATUS AND METHOD

GOVERNMENT RIGHTS

This invention was made with government support under Contract No. 69-201514 awarded by the Department of the Army. The United States Government has certain rights in the invention.

TECHNICAL FIELD

The present disclosure relates to a method and apparatus for aligning a fiber optic connector with a detector or emitter.

BACKGROUND

Optical fibers are used to carry signals in many applications in which high-bandwidth and/or immunity to electromagnetic interference is desired, such as telecommunications systems and radar systems. In such applications, a cable containing one or more optical fibers (i.e., a fiber optic cable) carries signals between a transmitter (e.g., a light emitting diode or LED) and a detector (e.g., a photodiode). Alignment of the fiber optic cable with a transmitter or a detector is critical to performance. One method of aligning a fiber optic cable with a transmitter or a detector in a housing involves manually moving the fiber optic cable relative to the transmitter or detector while observing a signal output on an oscilloscope. When the signal strength is acceptable, the fiber optic cable is secured to the housing. This method is time consuming, difficult to repeat consistently, and prone to error.

SUMMARY OF THE INVENTION

A first aspect of the invention is directed to an apparatus for aligning a fiber optic connector with a detector or an emitter in a housing, wherein the fiber optic connector includes an alignment sleeve mountable on the housing adjacent the detector or emitter and a ferrule configured to receive an optical fiber and to fit in the alignment sleeve. The apparatus comprises a stationary base mountable on the housing, a mobile stage movable on the stationary base, and adjustment screws extending from the stationary base to the mobile stage to permit adjustment of a position of the mobile stage in x and y directions relative to the stationary base. The stationary base may include a first central opening configured to allow the stationary base to be positioned around the fiber optic connector, and a first clearance slot extending from a periphery of the stationary base to the first central opening. The mobile stage may include a second central opening configured to allow the mobile stage to be positioned around the fiber optic connector, and a second clearance slot extending from a periphery of the mobile stage to the second central opening. The adjustment screws on the stationary base may be oriented orthogonally relative to one another to adjust a position of the mobile stage in x and y directions relative to the stationary base. When the alignment apparatus is positioned around the fiber optic connector, set screws in the stationary base and the mobile stage may be used to secure the alignment apparatus in place. Movement of the mobile stage may be imparted to the fiber optic connector so that the fiber optic connector may be aligned with the emitter or detector in the housing by operation of the adjustment screws. The first and second clearance slots may be configured to serve as a passage for a fiber optic cable extending from the fiber optic connector when positioning and/or removing the alignment apparatus, so that disconnection and reconnection of the fiber optic connector may be avoided.

A second aspect of the invention is directed to a method of aligning a fiber optic connector with a detector or an emitter in a housing, wherein the fiber optic connector includes an alignment sleeve mountable on the housing adjacent the detector or emitter and a ferrule configured to receive an optical fiber and to fit in the alignment sleeve. In an embodiment, the method includes the steps of mounting the fiber optic connector loosely on the housing so that it can move a predetermined amount in relation to the detector or emitter, placing a stationary base on the housing so that the fiber optic connector is received in a first central opening in the stationary base and a second central opening in a mobile stage movable relative to the stationary base, holding the stationary base in a fixed position relative to the housing, adjusting a position of the fiber optic connector relative to the detector or the emitter in the housing by moving the movable stage with a pair of orthogonally oriented adjustment screws on the stationary base, fixedly securing the fiber optic connector to the housing after adjusting the position of the fiber optic connector relative to the detector or emitter in the housing, releasing the stationary base from the housing, and removing the stationary base and the mobile stage without disconnecting or decoupling the fiber optic connector by orienting slots in the stationary base and the mobile stage with an optical fiber extending from the fiber optic connector and moving the stationary base and the mobile stage laterally relative to a long axis of the optical fiber.

An example embodiment of the invention is described below with reference to the following drawing figures, in which like reference numerals in the various figures are utilized to designate like components.

DESCRIPTION OF EXAMPLE EMBODIMENTS

The invention is directed to an apparatus for aligning a fiber optic connector, such as an SMA-type connector or similar, with a detector or an emitter in a housing. In an example embodiment, the apparatus includes a stationary base mountable on the housing, a mobile stage movable relative to the stationary base, and spring-loaded adjustment screws on the stationary base oriented orthogonally relative to one another to adjust a position of the mobile stage in x and y directions. The stationary base and mobile stage include central openings that allow the alignment apparatus to be positioned around the optical connector. The central opening in the base may be configured to receive the housing, and the central opening in the mobile stage may be configured to receive the fiber optic connector. The stationary base and mobile stage may also include lateral clearance slots extending inwardly from their respective peripheral edges to their respective central openings to allow passage of a fiber when positioning and/or removing the alignment apparatus. Set screws in the stationary base and the mobile stage may be used to secure the alignment apparatus in place. The spring-loaded adjustment screws may then be used to adjust the x-y position of the mobile stage, and thus the fiber optic connector, relative to the detector or emitter in the housing. When the fiber optic connector is properly aligned with the detector or emitter, the fiber optic connector may be fixed in place on the housing, e.g., by tightening mounting screws via slots formed in the mobile stage. The alignment apparatus may be removed by lifting the alignment apparatus from the housing to clear the fiber optic connector and moving it laterally or sideways so that the optical fiber passes through the lateral clearance slots, eliminating the need to disconnect the fiber from the connector, which is advantageous because whenever a fiber optic cable is disconnected and reconnected, its alignment is disrupted. Being able to remove the alignment apparatus after alignment is complete is also advantageous because it allows the alignment apparatus to be re-used.

Figure 1:
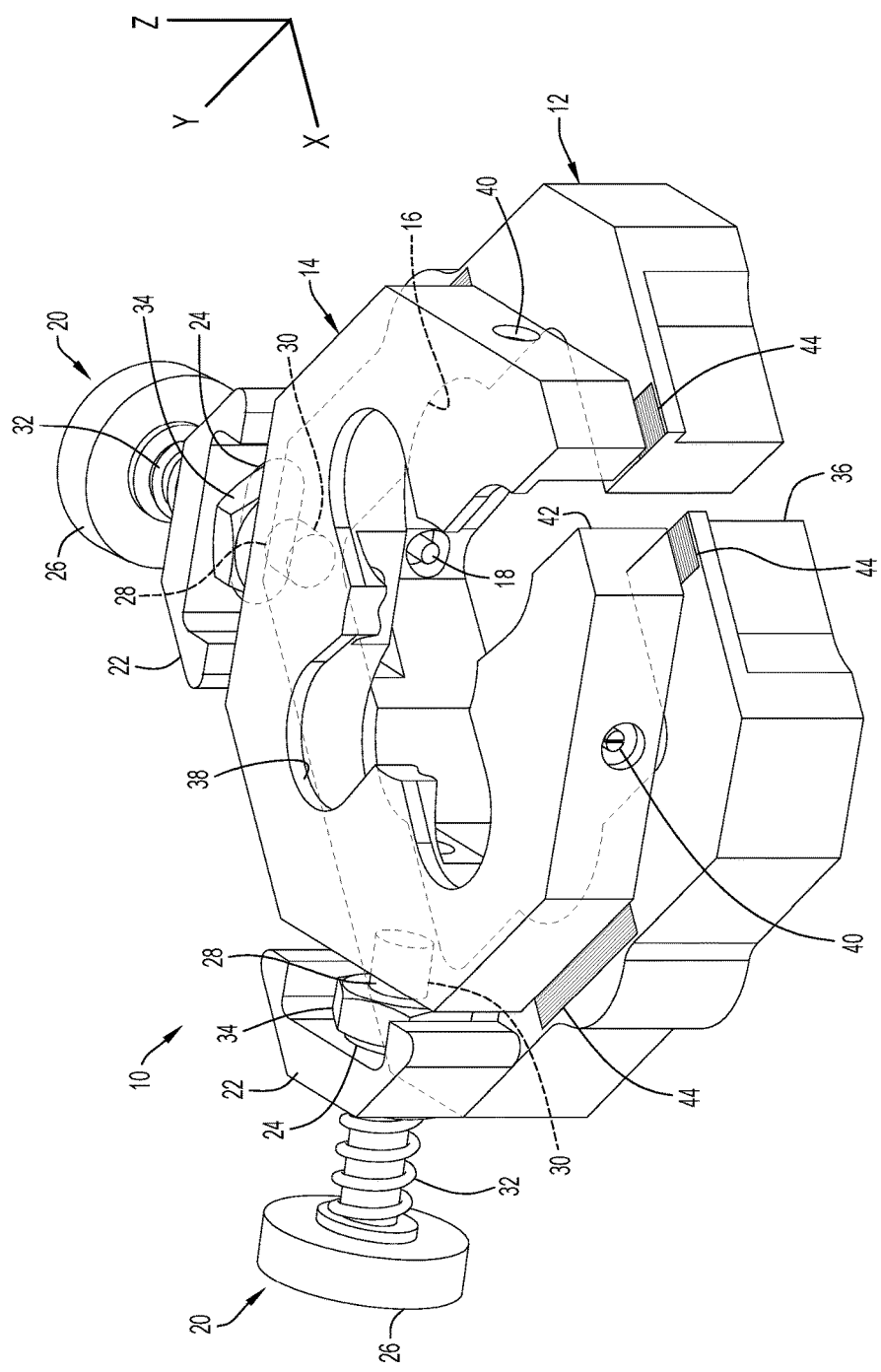
FIG. 1 is a perspective view of an apparatus for aligning a fiber optic connector with a detector or an emitter according to an example embodiment of the invention.

FIG. 1 shows an apparatus 10 for aligning a fiber optic connector with a detector or an emitter in a housing according to an example embodiment of the invention. The apparatus 10 includes a stationary base 12 and a mobile stage 14. The stationary base 12 is configured to be mountable on a housing. For example, in the example embodiment shown, the stationary base 12 is configured to be clamped to a generally square, plate-like housing containing a detector or emitter. To that end, a first clearance opening 16 corresponding generally in shape and size to a periphery of the housing may be formed through a central or medial portion of the stationary base 12 to receive therein the housing. Preferably, the first central opening 16 is slightly larger than the periphery of the housing to define a small gap (e.g., 0.010 inches) between the stationary base 12 and the housing that makes it easier and less time consuming to position the stationary base around the housing. The stationary base 12 may also include one or more set screws 18 that may be extended horizontally (or in the x-y plane) from threaded holes in the stationary base across the gap to clamp the base to the housing so that it remains stationary relative to the housing. The set screws 18 may be positioned anywhere around the base, but are preferably oriented orthogonally relative to one another, e.g., below adjustment screws 20 as shown in the example embodiment.

Figure 2:
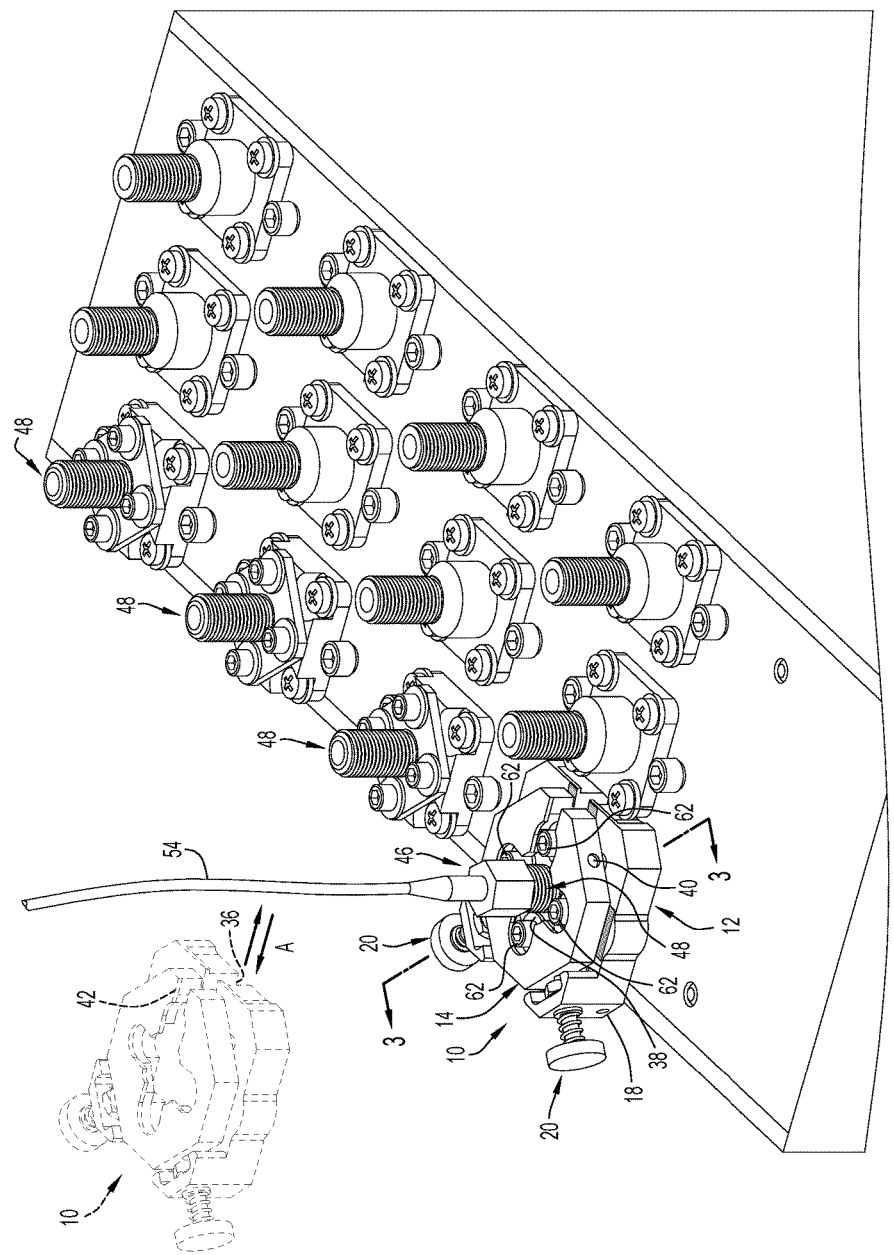
FIG. 2 is a perspective view of the apparatus of FIG. 1 being utilized to align a fiber optic connector with a detector or an emitter according to an example embodiment of the invention.

A periphery of the stationary base 12 may be of any suitable shape, such as octagonal (or square with chamfered corners) as shown in the example embodiment. To facilitate use of the alignment apparatus 10 with an array of fiber optic connectors (e.g., as shown in FIG. 2), the periphery of the stationary base 12 may be configured so that, when the stationary base is mounted on a housing in an array, the stationary base is spaced from neighboring detector or emitter housings in the array. The periphery of the stationary base 12 may also include grasping surfaces, such as protrusions and/or notches, to facilitate safe handling of the alignment apparatus 10.

Looking at FIG. 1, a pair of flanges 22 extend upwardly (or in the z direction) from sides of the stationary base 12 that are orthogonal relative to one another. Elongate through-openings or channels 24 are formed in the flanges 22, respectively, and have long axes oriented horizontally (or in the x-y plane). The adjustment screws 20 include screw heads 26 in the form of finger knobs outside the flanges 22 and threaded shafts 28 that extend from the finger knobs through the elongate openings 24, respectively, into threaded holes (see FIG. 3 at 30) in the mobile stage 14. The adjustment screws 20 are sufficiently long to remain threaded in the mobile stage 14 throughout a desired range of adjustment (e.g., a range of adjustment of at least ±0.0040 inches). In other words, each adjustment screw 20 is preferably long enough to be threaded into the mobile stage 14 more than twice the desired range of adjustment. The adjustment screws 20 are oriented orthogonally relative to one another, and it will be appreciated that each adjustment screw can move linearly in a corresponding elongate opening 24 in response to orthogonal forces applied by the other adjustment screw. A helical coil spring 32 is held in compression between each finger knob 26 and the corresponding flange 22 to reduce play and improve precision. A nut 34 may also be disposed between the flange 22 and the mobile stage 14 to set a desired spring compression.

Referring still to FIG. 1, a first clearance slot 36 extends from a periphery of the stationary base 12 to the first central opening 16. A width of the first clearance slot 36 is preferably chosen to permit passage of a fiber optic cable through the first slot. For example, in the example embodiment shown, the first slot 36 may be larger than a diameter of the fiber optic cable and smaller than a width of the fiber optic connector. The first slot 36 may be formed through any side of the stationary base 12, but is preferably formed through a side opposite the first and second adjustment screws 20, e.g., about 135° from the axes of the adjustment screws, to enhance structural rigidity of the stationary base.

The mobile stage 14 is movable horizontally (or in the x-y plane) on the stationary base 12 using the adjustment screws 20. More specifically, if the adjustment screws 20 are oriented in the x and y directions, respectively, tightening the adjustment screw oriented in the x direction causes the mobile stage 14 to be retracted in the x direction toward the corresponding screw head 26 and loosening the same adjustment screw causes the mobile stage to be advanced in the x direction away from the screw head. Similarly, tightening the adjustment screw oriented in the y direction causes the mobile stage 14 to be retracted in the y direction toward the corresponding screw head 26 and loosening the same adjustment screw causes the mobile stage to be advanced in the y direction away from the screw head. Since each adjustment screw 20 passes through an elongate opening 24 in a corresponding flange 22 on the base 12 of the apparatus 10, the adjustment screw oriented in the x direction can move laterally in the y direction with the mobile stage, and the adjustment screw oriented in the y direction can move laterally in the x direction with the mobile stage.

Figure 3:
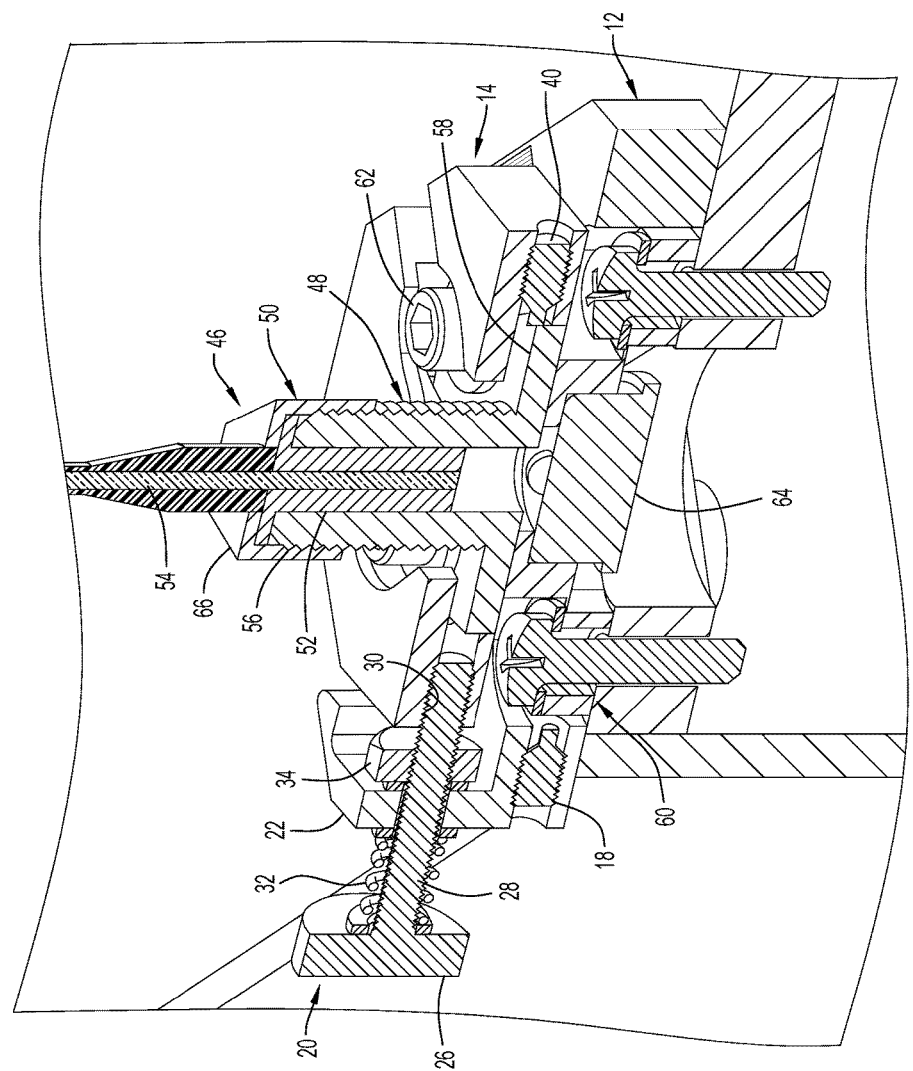
FIG. 3 is a cross-sectional view taken though line 3-3 in FIG. 2.

A second clearance opening 38 corresponding generally in shape and size to a periphery of the fiber optic connector may be formed through a central or medial portion of the mobile stage 14 to receive therein the fiber optic connector. For instance, in the example embodiment shown, the second central opening 28 is generally a quatrefoil or clover shape with four lobes positioned around a center opening to receive a fiber optic connector having four screw heads for fastening the connector to the housing. Preferably, the second central opening 38 is slightly larger than the periphery of the fiber optic connector to define a second gap (e.g., 0.004 inches) between the mobile stage 14 and the fiber optic connector that makes it easier and less time consuming to position the apparatus. The mobile stage 14 may also include one or more set screws 40 that may be extended horizontally (or in the x-y plane) from threaded holes in the mobile stage across the gap to clamp the mobile stage to the fiber optic connector so that the mobile stage and the fiber optic connector may move as a unit. If the fiber optic connector includes a connector housing containing a ferrule and an alignment sleeve configured to receive the ferrule, the set screws 40 may be positioned to engage the connector housing or the alignment sleeve, and not the threaded fasteners used to connect the alignment sleeve to the emitter or detector housing, so as not to interfere with tightening of the threaded fasteners once the fiber optic connector has been aligned with the emitter or detector in the housing. For instance, in the example embodiment shown, the set screws 40 for the mobile stage 14 may be positioned between the lobes of the second clearance opening (e.g., so that they engage a flange at the base of the alignment sleeve as shown in FIG. 3).

Referring still to FIG. 1, a second clearance slot 42 extends from a periphery of the mobile stage 14 to the second central opening 38. A width of the slot 42 is preferably chosen to permit passage of a fiber optic cable through the second slot. For example, in the example embodiment shown, the second slot 42 may be larger than a diameter of the fiber optic cable and smaller than a width of the fiber optic connector. The second slot 42 is preferably formed in alignment with the first slot, e.g., about 135° from the axes of the adjustment screws, so that the first and second slots at least partially overlap one another to allow passage of a fiber optic cable therethrough when positioning or removing the apparatus as described hereinafter. In the example embodiment shown, the respective widths of the first and second slots are about the same. However, respective widths of the slots may be different from one another so long as the amount of overlap is wide enough to allow passage of a fiber optic cable therethrough.

The apparatus 10 may also include reference markings on the stationary base 12, for instance as shown in the example embodiment at 44, to assist the user in quantifying the amount of adjustment made and/or the amount of adjustability available. For instance, as shown in the example embodiment, the markings 44 may include a series of parallel lines in two orthogonal directions on the stationary base 12 proximate the periphery of the mobile stage 14 to provide a reference in the x and y directions.

A method of aligning a fiber optic connector with a detector or an emitter in a housing using the example embodiment shown in FIG. 1 will now be described with reference to FIGS. 2 and 3. In the example embodiment shown in FIGS. 2 and 3, the fiber optic connector 46 is a so-called SMH type fiber optic connector that includes an alignment sleeve 48 mountable on the emitter or detector housing and a fiber optic connector housing 50 with a ferrule 52 configured to receive an optical fiber 54 and to fit within the alignment sleeve. The alignment sleeve 48 may include an externally threaded tubular portion 56 for receiving the ferrule 52 and a flange 58 at the base with holes for fastening the alignment sleeve to the emitter or detector housing 60 with screws 62. The flange 64 may be square as shown and may have through-holes formed therethrough that are larger than the threaded shaft of the screws 62 used to fasten the alignment sleeve 48 to the emitter or detector housing 60, so that the position of the alignment sleeve relative to the emitter or detector 64 in the housing can be adjusted in x and y directions when the screws are loose (i.e., not tightened enough to prevent movement). For instance, in an example embodiment, the through-holes may be 0.0080 inches larger than the screws to allow ±0.0040 inches of adjustment in the x and y directions. The connector housing 50 may also include a rotatable barrel nut 66 disposed around the ferrule 52 and having internal threads to mate with the alignment sleeve 48 in order to couple the fiber optic connector components together.

The method includes mounting the fiber optic connector 46 loosely on the housing 60 so that it can move a predetermined amount (e.g., ±0.0040 inches) in relation to the detector or emitter 64. For instance, in the example embodiment shown, four screws 62 may be inserted through the oversized openings in the flange 58 of the alignment sleeve 48 and may be partially threaded into holes in the housing 60 in order to loosely mount the fiber optic connector to the emitter or detector housing. The connector housing 50 may already be coupled with the alignment sleeve 48 when the alignment sleeve is fastened to the emitter or detector housing 60, or the connector housing may be coupled with the alignment sleeve after the sleeve has been fastened to the emitter or detector housing.

The method further includes placing the alignment apparatus 10 on the emitter or detector housing 60 so that the fiber optic connector 46 is received in the first central opening 16 in the stationary base 12 and the second central opening 38 in the mobile stage 14. If the connector housing 50 is already coupled with the alignment sleeve 48 as shown in FIG. 2, the apparatus 10 may be placed on the emitter or detector housing 60 by orienting the first and second slots 36 and 42 with the fiber optic cable 54 extending from the connector housing and moving the apparatus laterally towards the fiber optic cable until the fiber optic cable passes through the slots into the first and second clearance openings. With the fiber optic cable 54 disposed within the first and second central openings 16 and 38, the apparatus 10 may be lowered onto the housing 60 around the fiber optic connector 46. If, on the other hand, the connector housing 50 has not yet been coupled with the alignment sleeve 48, the apparatus 10 may be placed directly on the housing 60 before the connector housing is coupled with the alignment sleeve.

After the apparatus 10 is placed on the emitter or detector housing 60, the stationary base 12 may be held in a fixed or stationary position relative to the housing. For instance, in the example embodiment illustrated in FIG. 3, this step may be performed by clamping the stationary base 12 to the housing 60, e.g., by extending set screws 18 from the stationary base to bear against the emitter or detector housing from orthogonal directions to prevent movement of the stationary base relative to the emitter or detector housing.

With the stationary base 12 held in a fixed position relative to the emitter or detector housing 60, a position of the fiber optic connector 46 relative to the emitter or detector 64 may be adjusted by moving the movable stage 14 with the pair of adjustment screws 20 on the stationary base. For instance, in the example embodiment shown in FIGS. 2 and 3, the adjustment screws 20 are oriented orthogonally relative to one another in slotted openings 24, so one adjustment screw can be used to move the mobile stage in the x direction and the other adjustment screw can be used to move the mobile stage in the y direction. Springs 32 may be held in compression between the screw heads 26 and the stationary base 12 help maintain a position of the mobile stage 14 during and after adjustment by preventing inadvertent movement of the adjustment screws 20. Furthermore, nuts 34 may be threaded on the adjustment screws 20 on a side of the springs 32 opposite the screw heads 26 to adjust a tension of the springs. In the example embodiment shown in FIG. 3, the mobile stage 14 may be fixed to the fiber optic connector 46 by extending set screws 40 in orthogonal directions from the mobile stage to bear against the alignment sleeve 48 so that the mobile stage and the fiber optic connector move as a unit.

In an embodiment, during the alignment step, an operator of the alignment apparatus 10 may monitor a signal or signals transferred between the optical fiber and the emitter or detector in the housing (e.g., using an oscilloscope or other signal analysis device) to determine when the fiber optic connector 46 is properly aligned with the emitter or detector 64.

Once the fiber optic connector 46 is properly aligned, the fiber optic connector may be fixedly secured to the emitter or detector housing 60. For instance, in the example embodiment shown in FIGS. 3 and 4, the fiber optic connector 46 may be secured to the housing 60 by tightening the screws 62 extending through the flange 58 of the alignment sleeve 48 with sufficient torque to prevent movement of the fiber optic connector relative to the emitter or detector housing. The screws 62 may be accessed through the clearance opening 38 in the mobile stage 14.

The apparatus 10 may then be disconnected from the housing 60 and optical connector 46, e.g., by loosening the set screws 18 holding the stationary base 12 in place and loosening the set screws 40 coupling the mobile stage 14 to the optical connector 46.

Finally, the alignment apparatus 10 may be removed without disconnecting or decoupling the fiber optic connector 46 by lifting the apparatus from the housing 60, orienting the slots 36 and 42 in the stationary base and the mobile stage with the fiber optic cable 54 extending from the fiber optic connector 46, and moving the apparatus laterally relative to a long axis of the fiber optic cable.

The above description is intended by way of example only. The description is not intended to be exhaustive nor is the invention intended to be limited to the disclosed example embodiment(s). Many modifications and variations will be apparent to those of ordinary skill in the art without departing from the scope and spirit of the invention. For example, while the stationary base in the example embodiment is configured to be removably mounted on the housing by clamping the base against the housing using set screws, it will be appreciated that the base may be removably mounted using a spring-loaded clamping mechanism, threaded fasteners that extend from the base into the housing, magnets, suction cups, and/or other types of fastening techniques that allow the base to be removed from the housing once the fiber optic connector is aligned with the detector or emitter. It will also be appreciated that the stationary base can be formed as a part of the housing in a non-removable manner. While the stationary base in the example embodiment is shown having a configuration to mount on a generally square housing, it will be appreciated that the stationary base can be configured to mount on housings having other shapes. Furthermore, while the first and second central openings in the stationary base and mobile stage, respectively, are shown in the example embodiment as being centered about the respective geometric centers of the stationary base and mobile stage, it will be appreciated that one or both of the central openings may be offset from the respective geometric centers. Additionally, while an apparatus for aligning SMH type fiber optic connectors is shown by way of example, it will be appreciated that the alignment apparatus may be modified to align other types of fiber optic connectors, including but not limited to SMA, SC, LC, FC, and other fiber optic connectors with fiber optic connector housings that may be threaded, latched, or otherwise mated with alignment sleeves. These and other modifications and variations are within the scope of the present invention.

What is claimed is:

1. An apparatus for aligning a fiber optic connector with a detector or an emitter in a housing, wherein the fiber optic connector includes an alignment sleeve mountable on the housing adjacent the detector or emitter and a ferrule configured to receive an optical fiber and to fit in the alignment sleeve, the apparatus comprising:
    a stationary base mountable on the housing, the stationary base including a first central opening configured to allow the stationary base to be positioned around the fiber optic connector, and a first clearance slot extending from a periphery of the stationary base to the first central opening;
    a mobile stage movable relative to the stationary base, the mobile stage including a second central opening configured to allow the mobile stage to be positioned around the fiber optic connector, and a second clearance slot extending from a periphery of the mobile stage to the second central opening; and
    a pair of adjustment screws on the stationary base oriented orthogonally relative to one another and extending to the mobile stage to adjust a position of the mobile stage in x and y directions relative to the stationary base.

2. The apparatus of claim 1, wherein the first and second clearance slots are oriented in a same direction.

3. The apparatus of claim 2, wherein respective widths of the first and second clearance slots are larger than a diameter of a fiber optic cable extending from the fiber optic connector.

4. The apparatus of claim 3, wherein respective widths of the first and second clearance slots are smaller than a width of the alignment sleeve.

5. The apparatus of claim 4, wherein the second central opening in the mobile stage is configured to fit around the alignment sleeve with a gap therebetween.

6. The apparatus of claim 5, further comprising a set screw extendable from the mobile stage to the alignment sleeve across the gap.

7. The apparatus of claim 6, wherein the alignment sleeve includes a mounting flange with openings formed therethrough for threaded fasteners, and wherein the set screw is extendable from the mobile stage to the mounting flange of the alignment sleeve.

8. The apparatus of claim 1, wherein the pair of adjustment screws are received within threaded openings formed in the mobile stage.

9. The apparatus of claim 8, wherein each adjustment screw further comprises a screw head and a spring held in compression between the screw head and the stationary base.

10. The apparatus of claim 9, wherein each spring is held in compression between a screw head and a flange extending from the stationary base.

11. The apparatus of claim 10, wherein each adjustment screw further comprises a nut threaded on the adjustment screw on a side of the flange opposite the spring.

12. The apparatus of claim 1, wherein the first central opening in the stationary base is configured to fit around the housing with a gap therebetween, and further comprising a set screw extendable from the stationary base to the housing across the gap.

13. A method of aligning a fiber optic connector with a detector or an emitter in a housing, wherein the fiber optic connector includes an alignment sleeve mountable on the housing adjacent the detector or emitter and a ferrule configured to receive an optical fiber and to fit in the alignment sleeve, the method comprising the steps of:

mounting the fiber optic connector loosely on the housing so that it can move a predetermined amount in relation to the detector or emitter;

placing a stationary base on the housing so that the fiber optic connector is received in a first central opening in the stationary base and a second central opening in a mobile stage movable relative to the stationary base;

holding the stationary base in a fixed position relative to the housing;

adjusting a position of the fiber optic connector relative to the detector or the emitter in the housing by moving the movable stage with a pair of adjustment screws on the stationary base, the adjustment screws being oriented orthogonally relative to one another;

fixedly securing the fiber optic connector to the housing after adjusting the position of the fiber optic connector relative to the detector or emitter in the housing;

releasing the stationary base from the housing; and removing the stationary base and the mobile stage without disconnecting or decoupling the fiber optic connector by orienting slots in the stationary base and the mobile stage with an fiber optic cable extending from the fiber optic connector and moving the stationary base and the mobile stage laterally relative to a long axis of the fiber optic cable.

14. The method of claim 13, wherein holding includes clamping the stationary base to the housing.

15. The method of claim 14, wherein clamping includes tightening a set screw in the stationary base against the housing.

16. The method of claim 13, wherein the adjustment screws extend through elongate openings formed in the stationary base and wherein the adjustment screws are allowed to move in the elongate openings during adjusting.

17. The method of claim 13, wherein adjusting includes holding a spring in compression between the stationary base and a respective head of each adjustment screw.

18. The method of claim 13, further comprising, prior to adjusting, coupling the mobile stage with the fiber optic connector.

19. The method of claim 18, wherein coupling the mobile stage with the fiber optic connector includes tightening a set screw in the mobile stage against the fiber optic connector.

20. The method of claim 19, wherein removing the stationary base and mobile stage further includes decoupling the mobile stage from the fiber optic connector.

* * * * *